United States Patent

Seppey

[15] 3,690,157
[45] Sept. 12, 1972

[54] METHOD AND APPARATUS FOR HARDNESS TESTING

[72] Inventor: Robert E. Seppey, South Bend, Ind.
[73] Assignee: The Bendix Corporation
[22] Filed: July 27, 1970
[21] Appl. No.: 62,216

[52] U.S. Cl. .................................. 73/78, 73/104
[51] Int. Cl. .................................. G01n 3/46
[58] Field of Search .............. 73/78, 105, 104, 150; 33/169 F; 29/78, 95; 30/164.9, 346, 353, 294

[56] References Cited

UNITED STATES PATENTS

| | | | |
|---|---|---|---|
| 2,541,974 | 2/1951 | Wills | 73/78 |
| 2,145,985 | 2/1939 | Krajicek | 30/294 |
| 3,583,216 | 6/1971 | Milewski | 73/150 |

OTHER PUBLICATIONS

Hamilton, "Scratch File Test" Metal Progress, p. 265, Sept. 1937.

Primary Examiner—Richard C. Queisser
Assistant Examiner—Marvin Smollar
Attorney—Gordon H. Chenez and Plante, Hartz, Smith and Thompson

[57] ABSTRACT

A practical method of shop testing for the presence of a superficial hard case on metals consists of scratching the surface with an instrument made of a steel selected for its excellent heat treating and tempering qualities carefully hardened to one to three points below the minimum hardness specified for the case. The instrument consists of a square or rectangular bar with a multiplicity of opposed notches machined to provide square corners with a prescribed minimum radius. Whenever it appears that the corners which are being used have been worn to an unacceptably large radius, a section of the bar can be snapped off and thrown away to expose four new corners for use.

4 Claims, 2 Drawing Figures

PATENTED SEP 12 1972 3,690,157

ROBERT E. SEPPEY
*INVENTOR.*

BY

AGENT

METHOD AND APPARATUS FOR HARDNESS TESTING

SUMMARY OF THE INVENTION

It has been the practice to specify superficial cases on metal parts as "file hard." This type of specification is of genuine utility if the surface is to be hardened to the maximum possible for carbon steels in the range of 63–65 Rockwell "C," as most commercial files are hardened to this range and will cut anything that is at least two to three points softer. At the present time many machined parts are made of Martensitic corrosion resistant steels, heat treated and tempered and superficial cases are produced by processes such as cyaniding and nitriding, and the hardness specified may be as low as Rockwell "C" 47.

The determination of such surface hardnesses by means of the highly sophisticated hardness testing machines in use in laboratories presents no problems other than of time consumed in performing the tests and the consequent cost involved. It is obvious, particularly when machining operations are to be performed after surface treatment, that a quick effective and uniform shop test be available so that a machinist or his supervisor can determine whether the proper hard case continues to exist in areas so specified, or has been removed in other areas as specified.

The tempering of files for the purpose of shop testing for superficial hardness in the low ranges referred to above was generally unsatisfactory for two reasons. The first one was that it was not always possible to determine the heat treating and tempering characteristics of the files and therefore the tempering was accomplished by much trial and error accompanied by frequent losses of costly material. The second reason was that the files would become dull and it was difficult to determine at what point they should be discarded. Also, on occasion, the parts involved might not present a suitable surface to be tested with a file. Consequently results tended to be non-uniform and generally unacceptable, and much time and expense were involved in the use of laboratory type hardness testing machines in order to confirm or disprove the results of the stop tests.

Consequently, it is an object of this invention to provide a method of performing a simple superficial hardness test for shop use on metal parts.

It is a further object to provide an instrument for performing a simple superficial hardness test in a factory or machine shop.

DETAIL DESCRIPTION OF THE INVENTION

Figure 1:
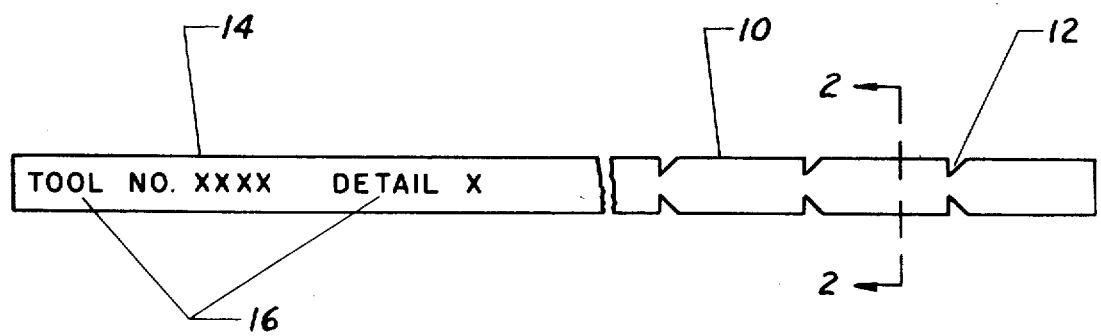
FIG. 1 is a side elevation view of a hardness testing instrument in accordance with the invention.
Figure 2:
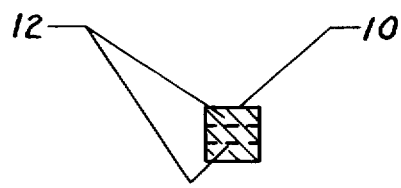
FIG. 2 is a section view of the instrument.

Referring to the drawings, there is shown an instrument fabricated from a tool steel carefully selected for its excellent heat treating and tempering characteristics. The instrument is an elongated bar 10, and, desirably, it may be of square or rectangular cross-section and approximately pencil size. One desirable configuration is a 3/16 inch square bar about 8 inches long. A series of V-shaped notches 12 are formed on two opposite sides of the bar at intervals of about one-half inch for about two-thirds or three quarters of the length of the bar 10. The notches 12 are formed with one side normal to the surface of the bar, forming square corners, and the other side at an angle which may be about 45°. A handle portion 14 is left unnotched as seen at the left of FIG. 1. The handle portion 14 is made about the shortest length that can be held in the hand conveniently. The bars are stamped on the handle portion 14 with appropriate identifying data as seen at 16 in the figure. The bars are then carefully heat treated to predetermined ranges of hardness slightly below the minimum hardness specified for the parts to be tested. For example bars specified as Detail 1 may be hardened to Rockwell "C" 57–59;
Detail 2 may be hardened to Rockwell "C" 50–52;
Detail 3 may be hardened to Rockwell "C" 46–48;
Detail 4 may be hardened to Rockwell "C" 44–46;

The instruments made in accordance with the various detail numbers will be used to test surface which have been specified to have a minimum superficial hardness of Rockwell "C" 60, 53, 49 and 47 respectively. After hardening, the bars 10 are carefully surface ground to insure that all of the corners conform to a minimum radius specification which, for example, may be 0.002 inch.

The testing method consists of selecting an instrument with an appropriate detail number and attempting to scratch the surface to be tested. If there is any doubt that the corner used is sharp, another corner may be used. If the four exposed corners are suspected of being dull, a section of the instrument is snapped off and discarded providing four new corners for use. When the instrument has been reduced to the handle portion 16 and the last four corners have been dulled, it is simply discarded. An important feature of this method of testing is that if the piece being tested equals or exceeds the minimum hardness, it will not be marked or damaged by the test, but, if the piece is not hard enough it will be scratched and permanently identified as a defective piece so that it can be properly disposed of or reworked. Surfaces tested for proper removal of the hard case, in most cases, will not have surface finish requirements that would be affected by the test scratch. It should be noted as another feature of the invention that the notches 12 serve a dual purpose of providing a succession of fresh corners and in addition provide a local weakening of the bar which makes it easy to snap off a section.

I claim;

1. An instrument for hardness testing of metal parts comprising:
   a rigid hardened bar of rectangular cross section having opposed notches spaced at intervals along its length to provide a spaced apart plurality of sharp corners for scratching the surface of a metal part to be tested;
   said bar being weakened in the region of said opposed notches to permit snapping off a dulled plurality of sharp corners of said bar to expose a previously unused plurality of sharp corners.

2. The instrument of claim 1 in which the notches are V-shaped with one side of the vee normal to the surfaces of the bar.

3. The instrument of claim 1 in which the bar is hardened to a range of one to three points on the hardness scale below the minimum hardness specified for the surfaces to be tested.

4. The instrument of claim 2 in which a portion of the bar is left un-notched to constitute a handle.

* * * * *